(12) United States Patent
Gianfranceschi

(10) Patent No.: US 10,767,499 B2
(45) Date of Patent: Sep. 8, 2020

(54) ACTUATOR LOCK

(71) Applicant: MICROTECNICA S.R.L, Turin (IT)

(72) Inventor: Marco Gianfranceschi, Turin (IT)

(73) Assignee: MICROTECNICA S.R.L., Turin (IT)

( * ) Notice: Subject to any disclaimer, the term of this patent is extended or adjusted under 35 U.S.C. 154(b) by 1013 days.

(21) Appl. No.: 14/828,609

(22) Filed: Aug. 18, 2015

(65) Prior Publication Data
US 2016/0053620 A1   Feb. 25, 2016

(30) Foreign Application Priority Data
Aug. 22, 2014  (EP) .................................... 14182042

(51) Int. Cl.
| | | |
|---|---|---|
| *F01D 5/32* | (2006.01) |
| *B64C 11/34* | (2006.01) |
| *B64C 27/72* | (2006.01) |
| *B64C 27/57* | (2006.01) |
| *B64C 27/00* | (2006.01) |
| *F03D 7/02* | (2006.01) |

(52) U.S. Cl.
CPC .............. *F01D 5/32* (2013.01); *B64C 11/346* (2013.01); *B64C 27/006* (2013.01); *B64C 27/57* (2013.01); *B64C 27/72* (2013.01); *B64C 2027/7266* (2013.01); *F03D 7/022* (2013.01); *F05B 2260/30* (2013.01); *Y02T 50/34* (2013.01)

(58) Field of Classification Search
CPC .................................. F01D 5/32; B64C 11/346
See application file for complete search history.

(56) References Cited

U.S. PATENT DOCUMENTS

2002/0154997 A1   10/2002  Elliott
2010/0296935 A1   11/2010  Kamen

FOREIGN PATENT DOCUMENTS

| FR | 845466 A | 8/1939 |
| GB | 746358 A | 3/1956 |

OTHER PUBLICATIONS

Notification of Transmittal of the European Search Report (and the Written Opinion of the International Searching or the Declaration); EP/14182042.3-1754; dated Feb. 18, 2015, 11 pages.
Paul Smith: "GCSES Physics Notes—The Electromagnectic Door Lock" Dec. 2, 2011, 2 pages.

*Primary Examiner* — Kenneth Bomberg
*Assistant Examiner* — Michael L Sehn
(74) *Attorney, Agent, or Firm* — Cantor Colburn LLP

(57) ABSTRACT

A locking device for use in a rotor blade, said locking device comprising: a locking member that is arranged to be movable from an unlocked position to a locking position upon experiencing sufficiently fast rotation; and a selectively engagable retaining device arranged when engaged to retain the locking member in the unlocked position. The locking device will typically default to an unlocked position during normal rotation and will only be locked so as to prevent movement when the retaining device is de-activated. A method of locking an actuator is also disclosed. The locking device has applications in helicopter rotor blades and wind turbine blades amongst others.

10 Claims, 5 Drawing Sheets

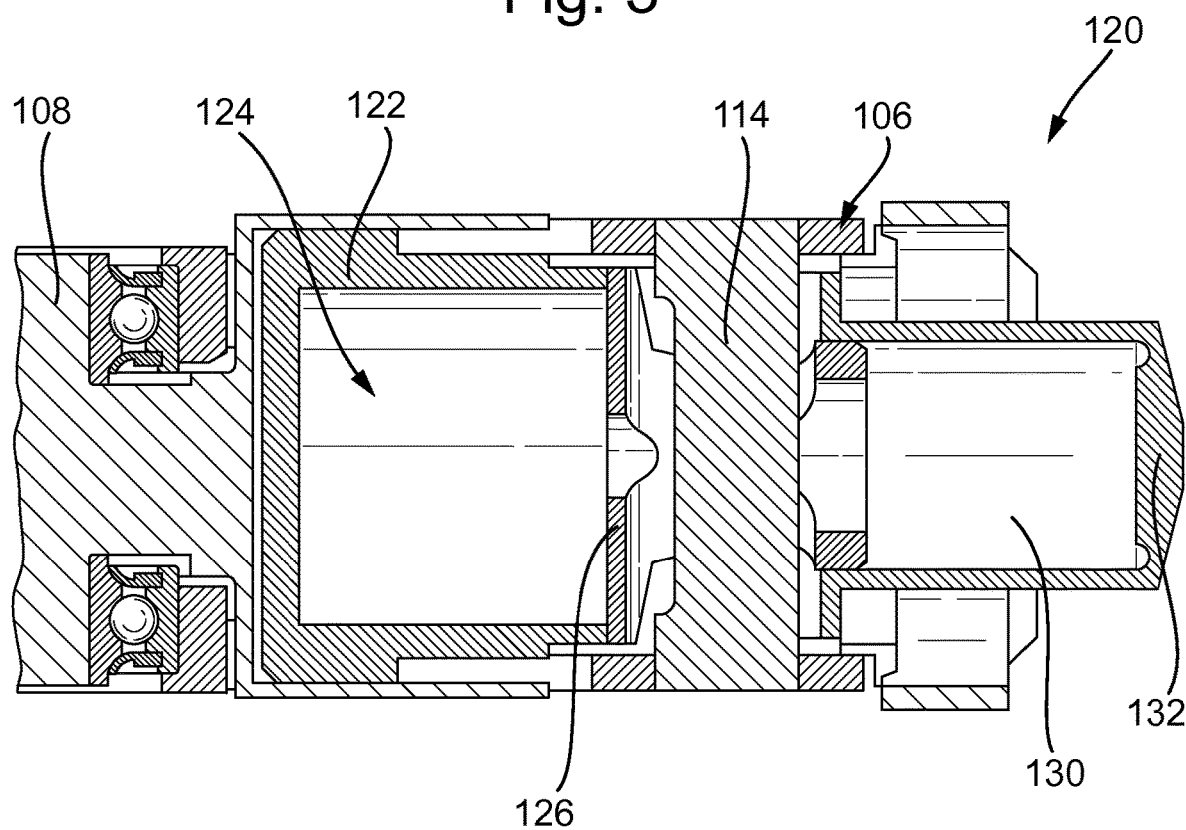

ACTUATOR LOCK

FOREIGN PRIORITY

This application claims priority to European Patent Application No. EP14182042.3 filed Aug. 22, 2014, the entire contents of which is incorporated herein by reference.

TECHNICAL FIELD

This disclosure relates to actuator locks for use in rotational environments, particularly for use in rotary blade systems such as helicopter rotor blades or wind turbine rotor blades.

BACKGROUND

Some advanced helicopter rotor systems have flaps on the rotor blades that act as secondary control surfaces and affect the aerodynamic characteristics of the blades. These are similar in nature to the flaps provided in fixed wing aircraft wings although they are generally smaller and more compact due to the smaller size of the rotor blades. These flaps can be used for improving the efficiency of the rotor blades by modifying the lift and by reducing the vibrations on the rotor.

Each flap requires an actuator to control its movement. Movement may be controlled by the pilot either directly or via an electronic controller. In the case of anti-vibration system the latter is more likely, with rotor flaps being automatically controlled based on the outputs of various sensors.

In certain circumstances it may be desirable to disable these flaps. This may be an intentional flight decision not to use them or it may be desirable to disable them in case of system failure.

Flaps will generally be provided on each of several rotor blades and there may be more than one flap per blade. It may be desirable to disable all or only some of the flaps.

SUMMARY

According to this disclosure there is provided a locking device for use in a rotor blade, said locking device comprising: a locking member that is arranged to be movable from an unlocked position to a locking position upon experiencing sufficiently fast rotation; and a selectively engageable retaining device arranged when engaged to retain the locking member in the unlocked position.

This arrangement makes use of the rotation of the rotor to accomplish movement of the locking member towards the locked position When the rotor is rotating in normal operation, the default position of the locking member is in the unlocked position and the locking member is retained by the retaining device. The lock may be engaged by disengaging the retaining device so that the locking member is pulled by the g force into the locking position. In some preferred examples, by making the retaining device dependent on a power source to retain the locking member, a fault in the system will result in the locking device losing power and entering the locked state as a fail safe condition.

The locking device may be arranged to move radially with respect to the rotor, i.e. substantially parallel to the length of the blade so that upon rotation of the rotor, the locking member experiences a g-force towards the tip of the blade. The locking position is thus radially outward of the unlocked position, i.e. the locking position is closer to the tip and the unlocked position is closer to the root of the blade.

The retaining device may be arranged when engaged to provide a retaining force equivalent to more than 200 g. "g" here is the gravitational acceleration at the earth's surface, i.e. about 9.8 ms-2. The actual force that must be provided by the retaining device will depend on the mass of the locking member which can vary according to the design and in particular according to the size of the rotor and the rotor blades. Helicopter rotors typically maintain a fairly constant rotation speed (typically a few hundred rpm, again dependent on size and construction). The g-force experienced varies along the length of the rotor such that a locking member located towards the centre of the rotor (i.e. nearer the blade root) may experience 300 g or less while a locking member located towards the outside of the rotor (i.e. nearer to the blade tip) may experience 750 g or more. In order to accommodate this range, in some examples, the retaining device may be arranged when engaged to provide a retaining force equivalent to more than 500 g. In other examples, the retaining device is preferably capable of supplying enough force to counteract 850 g.

The retaining device may be any mechanism that can selectively retain the locking member, i.e. it can be switched between a retaining state and a non-retaining state. In the retaining state, the locking member is held in the unlocked position against the g-force of the rotor rotation. In the non-retaining state, the locking member is allowed to move under the g-force and thus moves into the locked state in which it prevents movement of the actuator. However, a convenient implementation is where the selectively engageable retaining device is an electromechanical actuator, preferably a solenoid. A solenoid is capable of providing a retaining force upon engagement by providing power to create a magnetic field to create a force on an armature (the locking member) to counteract the g-force of the rotor. The solenoid may either act to hold the armature against the solenoid coil or force the armature away from it. Either way, the armature can be released simply by switching off the power to the coil, thus allowing the armature to move to the locked state under the rotor g-force. Such electromechanical arrangements are particularly advantageous because they can be small and involve few moving parts. The mounting space for such equipment inside a rotor blade is very limited and all parts experience a high-g environment, so reliability under extreme forces is an important consideration.

In some examples, the solenoid may be small for the purpose of minimizing size and cost of components. The solenoid cannot then be used to disengage the lock while the rotor is spinning since the pulling capability of the solenoid falls off rapidly as the armature moves away from the coil. For example, in a typical implementation, when the armature is more than 0.5 mm from the solenoid, the solenoid provides insufficient attractive force to pull the armature back against the full speed spinning rotor g-force. For this reason, in such examples the unlocked position may not be restored during normal rotation (e.g. in flight in the case of helicopter blades) after a locking process has happened. Instead, to re-engage the lock it is necessary to slow down the rotor so that the armature can be moved back to the unlocked position.

In normal operation, when the rotor is spinning at full speed, it is preferred that in the event of a fault, accidental or unwanted movement of the actuator is prevented. However it may also be preferred that when the rotor is stationary (or spinning down and at low speed), the default position be that the lock is disengaged. This facilitates repair and maintenance of the blades as the actuators are unlocked when the power is off, allowing correct movement to be checked and assessed. Therefore a resilient biasing device may be arranged to bias the locking member in the direction of the unlocked position. The biasing force provided by this biasing device must be less than the g-force experienced by the locking member under normal rotation. For example, the biasing device may provide a biasing force equivalent to about 200 g, i.e. less than the minimum 300 g that is experienced by a locking member mounted at a relatively inner position on a helicopter blade. It will be appreciated that other biasing values will apply in other circumstances. Again, the actual force to be provided by the biasing member will depend on the mass of the locking member which will vary with design and application. The biasing device may be a spring, e.g. a coil spring, although other biasing devices may equally well be used.

A further advantage of the biasing device when used together with an electromechanical actuator such as a solenoid, is that it provides a force to move the locking member back to the unlocked position when the force provided by the electromechanical actuator is weak due to the separation of the locking member (armature) from the coil. Once the rotor speed has dropped sufficiently, the biasing device will ensure that the armature once again comes into sufficiently close contact with the coil that the retaining force provided by the retaining device is strong enough to hold the locking member against the g-force of full normal rotation speed.

The way in which the locking device prevents movement of the relevant actuator may vary from one device to another, but in some preferred examples, in the locking position the locking member engages with a pin so as to prevent movement of the pin. In other examples, the locking member may engage with any other part of the moving actuator assembly, e.g. an actuator rod or a pivoting part such as a lever or cam. The locking member may simply engage frictionally with the pin (or other part) with sufficient force to prevent actuation. However, preferably the locking member blocks movement of the pin. The locking member may have a groove that engages with said pin.

The engagement of the locking member with the pin (or other part) may simply prevent further movement, thus locking the pin in its current position at the time of engagement. However, in some examples, it is preferred that the pin (or other part) be held in a predetermined position in the locked position, e.g. in a neutral position. For example in the case of secondary movable blade surfaces (such as flaps) it may be preferred that they be held in line with the rest of the blade, i.e. in a non-deployed or neutral position. It may of course be held at any other predetermined position within its normal range of motion. To achieve this, the locking member may comprise a groove with sloped sides that are arranged to guide the pin (or other part) to a predetermined position. For example, when the locking member is released and moves radially outwardly, if the pin is in a position different from the predetermined position, one of the sloped sides will contact the pin and bias it towards the predetermined position as the locking member moves further in the radially outward direction. With this arrangement, in the locked state the pin will be moved to and held in the predetermined position and cannot move from that position until the locking member is disengaged.

According to this disclosure there is also provided a rotor blade comprising one or more locking devices as described above, optionally including any of the optional or preferred features described above. In some examples the rotor blade may have one, two or three locking devices, e.g. corresponding to different control surfaces (flaps and/or slats) on the blade. A rotor may comprise two or more rotor blades, e.g. two, three, four or more blades. In one example a rotor of five blades, each with three locking devices is provided.

Accordingly, this disclosure also provides a rotor blade comprising one or more adjustable blade surfaces each having an actuator and each having a locking device as described above arranged to lock said actuator. The actuators may be for controlling control surfaces such as flaps and/or slats on the blade. The adjustable surfaces may be part of an anti-vibration system. The control of actuators for such surfaces may be performed by an electronic controller. The blade may be a helicopter or wind turbine blade, although it will be appreciated that the disclosure may be applied to any rotor blade.

According to another aspect, this disclosure provides a method of locking an actuator in a rotor blade, comprising: a locking member moving from an unlocked position to a locked position upon experiencing sufficiently fast rotation of the rotor blade; wherein in the locked position said locking member prevents movement of said actuator.

The method may further comprise the step of: releasing a selectively engageable retaining mechanism so that it no longer retains the locking member in an unlocked position. The rotation speed of the rotor blade may be sufficient that the locking member experiences a g-force that overcomes the force of a biasing device arranged to bias the locking member towards an unlocked position.

The preferred features described above in relation to the locking device all also apply to the method of locking. For example, the method of locking may include sloped surfaces of a groove on the locking member biasing a locking pin (or other part) into a predetermined position during movement from the unlocked position to the locking position.

BRIEF DESCRIPTION OF DRAWINGS

One or more non-limiting examples will now be described, by way of example only, and with reference to the accompanying figures in which:

FIG. 3 shows a locking mechanism in more detail.

DETAILED DESCRIPTION

Figure 1:
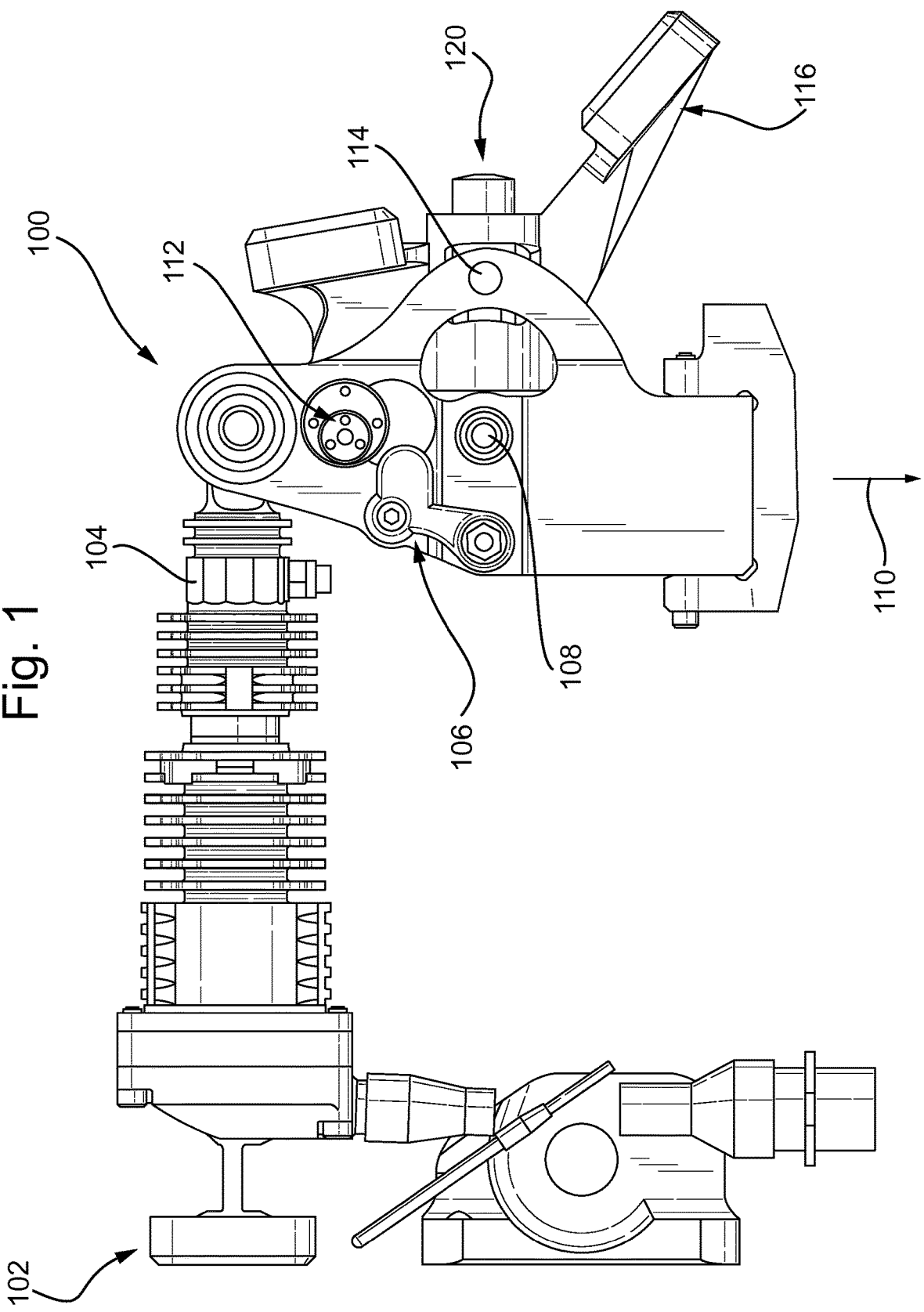
FIG. 1 shows an actuator and locking mechanism.

FIG. 1 shows an actuator system 100 for a movable surface on a helicopter rotor blade. System 100 includes an actuator 102 and rod 104 which pushes a lever 106 that is rotatable about pivot 108 leading to output motion as indicated by arrow 110.

A sensor 112 senses the position of lever 106. The main function of the position sensor 112 is to provide an independent measurement of the position of the lever 106 in addition to the one derived from the position of the actuator 102. It can be used for monitoring purposes. It is independent of the locking mechanism described below.

Lever 106 has a pin 114 that moves as the lever 106 rotates about its pivot 108. The locking mechanism 120 shown in FIGS. 3, 4a and 4b acts on this pin 114 so as to be able to prevent movement of the pin 114 and thereby prevent movement of the lever 106 and actuator 102.

Figure 2:
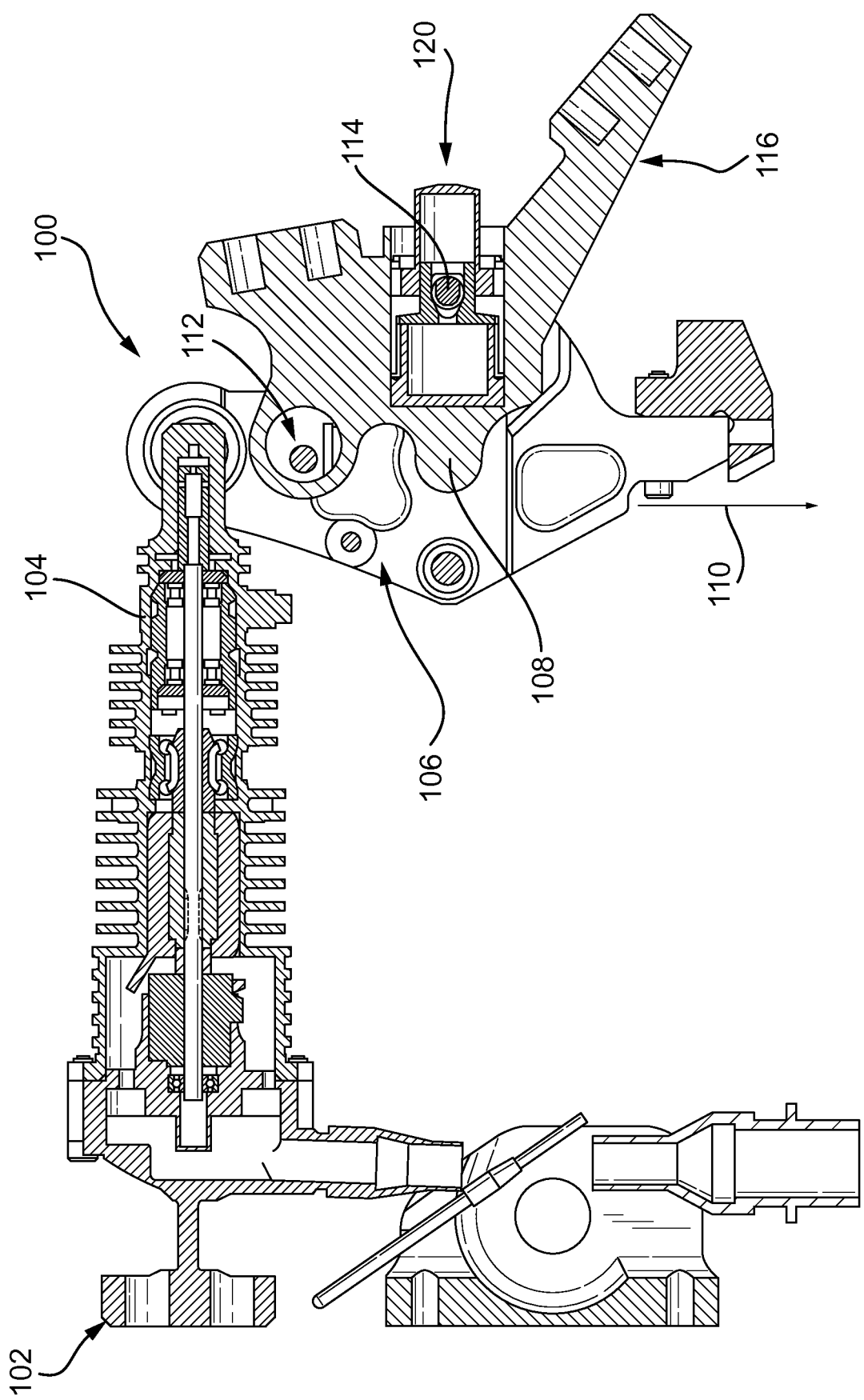
FIG. 2 shows the system of FIG. 1 in cross-section.

As can best be seen in FIG. 2, the locking mechanism 120 is mounted on a static support 116. This support 116 is static with respect to the rotor blade in which it is mounted, i.e. the lever 106 rotates with respect to support 116. Lever 106 is mounted to support 116 via pivot 108.

The locking mechanism 120 is shown in more detail in FIG. 3 which is a cross-section through the mechanism 120 viewed from an angle 90 degrees to the viewing angle of FIG. 1 so that FIG. 3 shows the side of the generally cylindrical locking pin 114 rather than the end thereof which is shown in FIG. 1. The locking mechanism (locking device) 120 includes a solenoid body 122 with solenoid coils (not shown in FIG. 3 but indicated by arrow 124) that can be selectively activated so as to create a magnetic attraction on armature 126. In FIG. 3, the armature 126 is shown pulled tight against the solenoid body 122 which is the unlocked position and thus the armature 126 is disengaged from locking pin 114. As the lever 106 rotates, locking pin 114 moves into and out of the paper as shown in FIG. 3.

Figure 4A:
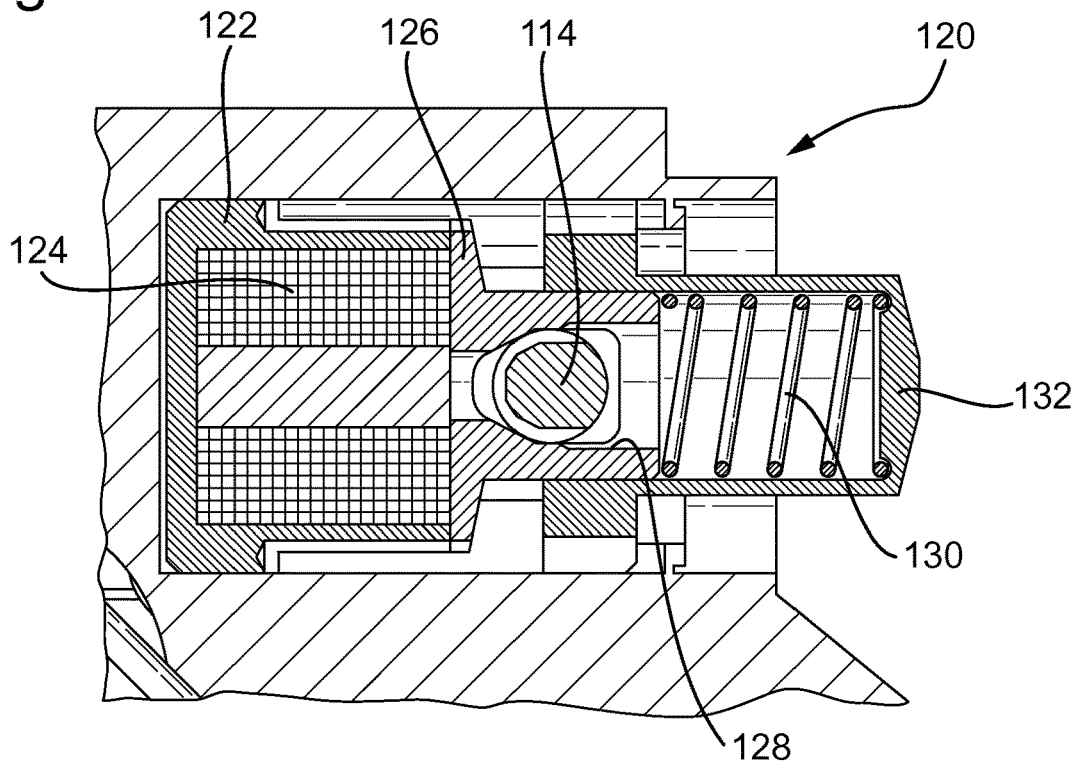
FIGS. 4a and 4b show the locking mechanism in unlocked and locking positions respectively.
Figure 4B:
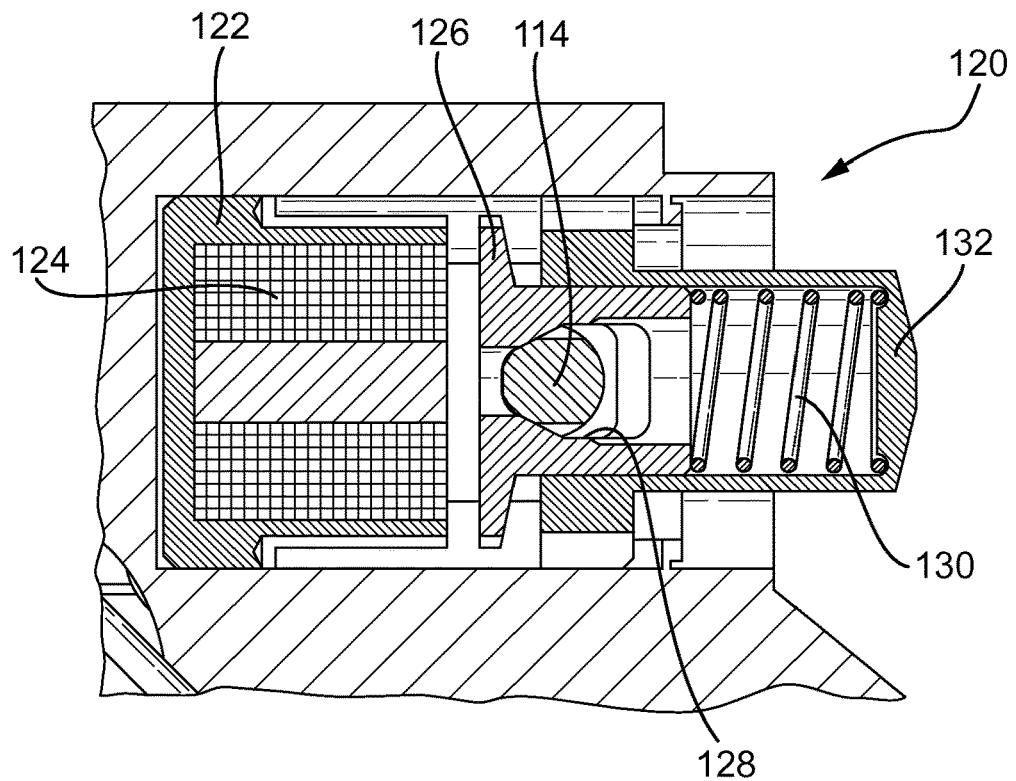

The operation of locking mechanism 120 will be described with reference to FIGS. 4a and 4b. FIGS. 4a and 4b are cross-sections through the locking mechanism 120, but taken in the same orientation as FIGS. 1 and 2 (and thus at 90 degrees to FIG. 3) so that they show the end of the generally cylindrical locking pin 114. FIG. 4a shows the unlocked state and FIG. 4b shows the locking state FIG. 4a illustrates the situation where solenoid coils 124 are active and the solenoid attracts the armature 126 so that it abuts the solenoid body 122. Locking pin 114 passes through a groove or hole 128 in the centre of armature 126. The spatial relationship between armature 126 and locking pin 114 in FIG. 4a is such that the locking pin 114 is free to move to a certain extent, i.e. the part of groove 128 that is aligned with pin 114 is wider than the diameter of pin 114 so that pin 114 can move within groove 128. This in turn allows lever 106 to move by pivoting around pivot 108 and thus permits the actuator 102 to cause movement of the flap (or other mechanism) attached to the output end of lever 106, thus operating the flap.

FIG. 4a also illustrates the situation where the solenoid coils 124 are inactive and there is no magnetic attraction to pull armature 126 into abutment with solenoid body 122. However a spring 130 housed in spring housing 132 also biases the armature 126 in the direction of the solenoid body 122 (i.e. towards the unlocked state). Spring 130 ensures that when the rotor is stationary (not rotating), the locking mechanism 120 is biased into the unlocked state. This provides a default state for a powered off/low rotor speed configuration, e.g. during inspection, maintenance or repair. In such situations it is desirable to have the system in the unlocked state so that correct movement of the flaps (or other mechanisms) can be checked without having to power on the solenoid 124.

Spring 130 provides a certain force on armature 126, but that force will only be sufficient to counter the g-force up to a certain rotation speed of the rotor. Thus above a certain rotation speed the spring 130 will be compressed and, in the absence of activation of the solenoid 124, armature 126 will move into the locked state of FIG. 4b. The strength of spring 130 is chosen to be strong enough that it reliably biases the armature 126 into the unlocked position when the rotor is stationary, but weak enough that it is overcome during normal operation of the rotor.

FIG. 4b shows the locking state in which pin 114 is held in place, preventing movement of lever 106. The spatial relationship between armature 126 and locking pin 114 in FIG. 4a is such that the locking pin 114 is secured and cannot move, i.e. the part of groove 128 that is aligned with pin 114 is essentially the same size as the diameter of pin 114 so that pin 114 cannot move within groove 128. This in turn prevents lever 106 from pivoting and moving and thus prevents actuator 102 from causing movement of the flap (or other mechanism) attached to the output end of lever 106.

FIG. 4b shows the state of the locking device when under normal rotation and when the solenoid 124 has released armature 126, i.e. when the g-force due to rotation has overcome the biasing force of spring 130. In this example, the solenoid 124 is not strong enough to pull the armature 126 back into a locked state against the g-force of normal rotation (even with the assistance of the spring). Therefore in this example once the locking device is locked it cannot be unlocked until the rotor is stopped or has been spun down to a sufficiently low speed. With this arrangement, the solenoid can be small which is important due to the space restrictions within the mounting environment. Therefore in normal operation, the solenoid 124 must be engaged so as to retain the armature 126 before the rotor is spun up or while it is still rotating at low speed.

In larger or slower rotors (e.g. in large wind turbines), a solenoid may be made large enough to pull the armature 126 back against the g-force of normal rotation. The pin 114 can thus be released, allowing it to move by activating the solenoid 124 (i.e. by passing a current there through) so as to draw armature 126 into contact with solenoid body 122, thus moving the wider part of groove 128 into alignment with pin 114 and permitting movement of the pin 114 and lever 106.

As can be seen in FIGS. 4a and 4b, the groove 128 has sloped sides such that the groove 128 narrows progressively from a wider region to a narrower region. The intermediate sloped sides serve to guide the locking pin 114 into a predetermined position as the armature 126 moves from the unlocked configuration (FIG. 4a) to the locking configuration (FIG. 4b). When the armature is in the unlocked position, the locking pin 114 may take a range of positions depending upon the current position of the actuator 102. If the actuator 102 (and thus the rest of the actuator assembly 100 and the output apparatus (e.g. a movable flap) are not in their neutral (central) position when the solenoid 124 is switched off and the armature 126 released, the pin 114 will not be aligned with the narrow part of groove 128 and the first contact between armature 126 and pin 114 will be on one side of pin 114. As the armature 114 progresses towards the locking position (under the g-force caused by rotor rotation), the sloped sides of groove 128 will force the pin 114 and thereby the lever 106, connecting rod 104 and actuator 102 as well as the flap itself (or other output mechanism) to move towards the predetermined position that is defined by the narrow part of groove 128. In this example, the predetermined position is a neutral, central position that will cause the connected flap to be aligned with the rest of the rotor blade so as to cause minimal alteration to the normal blade profile. However this need not be the case—the groove 128 may be asymmetrical, defining a locked position of the actuator system and output mechanism that is non-central. The predetermined position is determined by the point at which both sides of groove 128 contact pin 114, thus clamping it and holding it in place.

Figure 5:
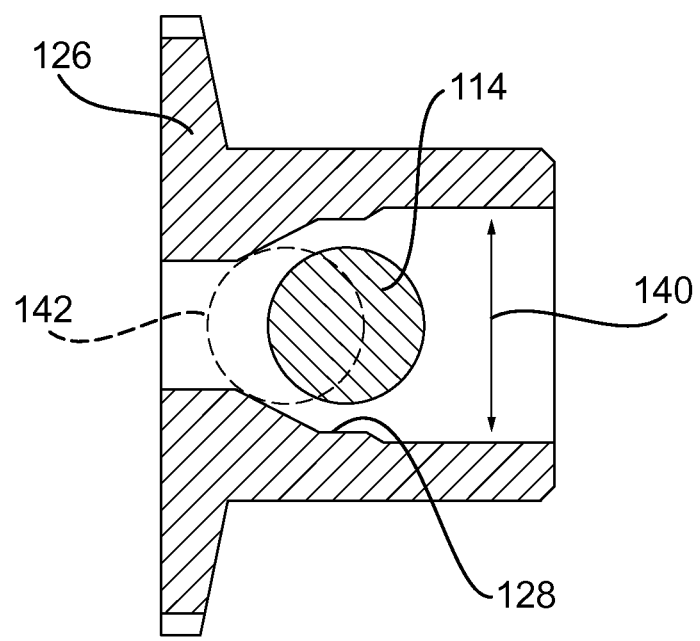
FIG. 5 illustrates an armature of the mechanism.

FIG. 5 shows the relationship between the armature 126 and the locking pin 114. The arrow 140 shows the movement that locking pin 114 is permitted to undertake within groove 128 in the unlocked position. The dashed circle 142 shows the relative position of the pin 114 with respect to the armature 126 in the locked position where it is clamped by the narrow part of groove 128 and no movement can occur.

The invention claimed is:

1. A rotor blade comprising:
   a locking device positioned inside the rotor blade, said locking device comprising:
   a locking member that is arranged to move radially with respect to the rotor blade and to be movable from an unlocked position to a locking position upon experiencing sufficiently fast rotation of the rotor blade, said locking position being radially outward of said unlocked position;
   a selectively engageable retaining device arranged when engaged to retain the locking member in the unlocked position; and
   a resilient biasing device, arranged to bias the locking member in the direction of the unlocked position.

2. The rotor blade as claimed in claim 1, wherein the retaining device is arranged when engaged to provide a retaining force per unit mass equivalent to more than 200 g.

3. The rotor blade as claimed in claim 2, wherein the retaining device is arranged when engaged to provide a retaining force per unit mass equivalent to more than 500 g.

4. The rotor blade as claimed in claim 1, wherein said selectively engageable retaining device is an electromechanical actuator.

5. The rotor blade as claimed in claim 1, wherein in the locking position the locking member engages with a pin so as to prevent movement of the pin.

6. The rotor blade as claimed in claim 5, wherein the locking member has a groove that engages with said pin.

7. The rotor blade as claimed in claim 6, wherein said groove has sloped sides arranged to guide the pin to a predetermined position.

8. The rotor blade as claimed in claim 1, comprising one or more adjustable blade surfaces, each having an actuator and each having a locking device as claimed in claim 1 arranged to lock said actuator.

9. The rotor blade as claimed in claim 8, wherein said adjustable surfaces are part of an anti-vibration system.

10. The rotor blade as claimed in claim 1, wherein said blade is a helicopter or wind turbine blade.

* * * * *